US009643275B2

(12) United States Patent
Spisic et al.

(10) Patent No.: US 9,643,275 B2
(45) Date of Patent: May 9, 2017

(54) INTERFACE OF A WELDING POWER SOURCE AND METHOD FOR DEFINING THE SAME

(75) Inventors: Bernhard Spisic, Hinzenbach (AT); Thomas Eisenkolb, Fischlham (AT); Patrick Kliemstein, Waizenkirchen (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 585 days.

(21) Appl. No.: 14/232,403

(22) PCT Filed: Jul. 10, 2012

(86) PCT No.: PCT/AT2012/050099
§ 371 (c)(1),
(2), (4) Date: May 6, 2014

(87) PCT Pub. No.: WO2013/006884
PCT Pub. Date: Jan. 17, 2013

(65) Prior Publication Data
US 2014/0238965 A1  Aug. 28, 2014

(30) Foreign Application Priority Data

Jul. 14, 2011  (AT) .................. A 1040/2011

(51) Int. Cl.
*B23K 9/10* (2006.01)
(52) U.S. Cl.
CPC .......... *B23K 9/1006* (2013.01); *B23K 9/1087* (2013.01)
(58) Field of Classification Search
CPC ...... B23K 9/095; B23K 9/0953; B23K 9/124; B23K 9/1006; G05B 2219/45135
See application file for complete search history.

(56) References Cited

U.S. PATENT DOCUMENTS 6,151,640 A   11/2000  Buda et al.
6,605,800 B1   8/2003  Schick et al.
(Continued)

FOREIGN PATENT DOCUMENTS

JP   2002-527246   8/2002
JP   2003-103366   4/2003
(Continued)

OTHER PUBLICATIONS

U.S. Appl. No. 14/232,368 to Bernhard Spisic et al., filed Jan. 13, 2014.
Japan Office action, mail date is Feb. 3, 2015.

*Primary Examiner* — Christopher Kim
(74) *Attorney, Agent, or Firm* — Greenblum & Bernstein, P.L.C.

(57) ABSTRACT

The invention relates to a method for defining an interface (32, 42, 52, 62) of a welding power source (31, 41, 51, 61) for communication with an external machine (26) that is connected to the interface. A freely configurable interface is used in the welding device, said interface being configured and activated via software directly via the operating panel of the welding power source or an external device that can be connected to the welding power source. A parameter of the welding device is allocated to an internal and/or external connection (101 . . . 105). Optionally, a link is established by stringing together graphic symbols of the software. The invention further relates to a welding power source (31, 41, 51, 61) and to a computer program which are set up for performing or storing the process according to the invention.

9 Claims, 8 Drawing Sheets

(56) References Cited

U.S. PATENT DOCUMENTS

| | | |
|---|---|---|
| 6,984,805 B2 | 1/2006 | Shimogama et al. |
| 7,220,941 B2 | 5/2007 | Niedereder et al. |
| 7,291,808 B2 | 11/2007 | Burgstaller et al. |
| 2002/0166849 A1 | 11/2002 | Sievert et al. |
| 2005/0205541 A1 | 9/2005 | Burgstaller et al. |
| 2007/0181548 A1* | 8/2007 | Kaddani .............. B23K 9/1062 219/130.21 |

FOREIGN PATENT DOCUMENTS

| | | |
|---|---|---|
| JP | 2005-500911 | 1/2005 |
| JP | 2005-527381 | 9/2005 |
| JP | 2008-264928 | 11/2008 |
| JP | 2010-029876 | 2/2010 |
| WO | WO 99/37435 | 7/1999 |
| WO | WO 02/058877 | 8/2002 |
| WO | WO 03/084706 | 10/2003 |

\* cited by examiner

INTERFACE OF A WELDING POWER SOURCE AND METHOD FOR DEFINING THE SAME

The invention relates to a method for defining an interface of a welding power source, to a welding power source having an interface and to a computer program product having a computer program stored thereon.

Ever increasing networking in the field of industrial processes means that devices which are used in such processes as a rule have an interface for the transmission of data and for communication with other devices. An example of a device of the mentioned type is a welding power source which can generally be used for the production of welds. In addition to the actual power source which forms the "heart", as it were, of a welding power source, the welding power source can also comprise further units which are usually required for welding. For example, a welding power source can comprise means for generating and controlling a flow of welding gas and/or means for cooling the welding torch.

The mentioned networking implies that a welding power source of this type often has an interface for communicating with a machine connected to the welding power source. In this respect, the interface comprises at least one internal connection to a control means of the welding power source and at least one external connection for the connection of external machines. For example, the welding power source can be connected to an industrial robot, thereby creating a welding robot. The robot and the welding power source are often provided by different manufacturers, thus making it necessary to coordinate the interfaces of the mentioned devices with one another.

As a rule, this happens as a special request from a customer who would like to connect devices of this type to one another. In this case, the manufacturers of the devices then create an interface intended specifically for the customer. However, standardised interfaces or flexible interfaces which make it possible to combine a welding power source with other machines according to the "plug and play" model do not exist.

This leads to some disadvantages. For example, the creation and configuration of a specific interface is relatively time-consuming and requires a great amount of expert knowledge. In addition, the creation of a specific interface also requires knowledge about external machines, as an engineer employed by the welding power source manufacturer should also know about the mode of operation of the machine to be connected thereto in order to be able to produce a correctly functioning interface. Since there are vast numbers of different types of machines, it is virtually impossible to be familiar with every conceivable combination of welding power source with a (random) machine. However, even if this expert knowledge is largely available, then these highly-skilled employees are in most cases fully stretched, which means that there are long waiting times for the creation of an interface. Due to the high installation costs of, for example, a welding robot, it is understandable that a customer may not be prepared to accept such a long waiting time. A further complicating factor is that, due to globalisation, technical staff often have to take on long journeys to create an interface of this type on site. In particular, it is especially irritating if minor faults which arise in an interface which has already been delivered have to be rectified.

Therefore the object of the invention is to provide an improved method for defining an interface of a welding power source, as well as an improved welding power source. In particular, the problems mentioned above are to be avoided.

The object of the invention is achieved by a method of the type mentioned above which comprises the following steps:
use of a freely configurable interface in the welding device, the interface being controlled, configured and activated in terms of software directly via the operating panel of the welding power source or an external device which can be connected to the welding power source, in particular an operating panel;
allocation of a parameter of the welding device to an internal and/or external connection;
and optional creation of a logical link by stringing together graphic symbols of a piece of software.

The object of the invention is further achieved with a welding power source of the type mentioned at the outset which also comprises:
a freely configurable interface arranged in the welding device, which interface can be controlled, configured and activated in terms of software directly via the welding device or an external device which can be connected to the welding power source, in particular via an operating panel; and the configuration of the interface comprises the following steps:
allocation of a parameter of the welding device to an internal and/or external connection;
and optional creation of a logical link by stringing together graphic symbols of a piece of software.

The object of the invention is further achieved by a computer program product having a computer program of the initially mentioned type stored thereon, which product can be loaded into the memory of a personal computer or of a welding power source according to the invention and which implements the method according to the invention when the computer program is executed there.

It is thereby achieved according to the invention that the creation and programming of an interface of a welding power source is greatly simplified and thereby can be taken over by less well-trained staff. Serious errors at least can be avoided due to the plausibility test according to the invention. Depending on the scope of the plausibility test, it is possible for programming errors to be completely prevented. Due to the simplification, comprehensive specialised knowledge about the welding power source for creating an associated interface is no longer necessary, so that for example even the customer or the manufacturer of a machine connected to the welding power source is in a position to program the interface. It is thereby possible to avoid long waiting times and time-consuming journeys due to a shortage of staff, as described at the outset.

Advantageous configurations and developments of the invention are provided in the subclaims and in the description combined with the figures.

It is advantageous when a graphic symbol comprises at least one function from the following group: allocation of an internal connection to an external connection, scaling of a value transmitted between the at least one internal connection and the at least one external connection, conversion of a unit of a value transmitted thus, transformation of a data format of a value transmitted thus, inversion of a value transmitted thus and time delay of a value transmitted thus, and when the function is integrated into the graphic symbol as a code. The mentioned functions are often required when setting up and programming an interface of a welding power source. It is therefore advantageous to subject a requirement for a function of this type to a plausibility test according to the invention in order to avoid errors as far as possible when creating the interface.

The method according to the invention is advantageous when it comprises the following steps:
- testing an interface definition which has been created using a model of the interface and a model, connected thereto, of the aforementioned machine, for plausibility, and
- transferring the interface definition into the real interface if the result of the plausibility test is positive.

In addition to the direct programming of the (physical) interface it is also possible to create an interface definition using a model of the interface and a model, connected thereto, of a machine connected thereto (for example, using a model of the welding robot). Thus the interface is created "offline" and is subjected to a plausibility test. Only if the result of the plausibility test is positive will the interface definition be transferred into the real interface. In this manner, it is possible to prevent dangerous situations, such as the accidental ignition of a welding arc. The "offline" programming also reduces the downtime of the devices concerned.

It is advantageous when the values transmitted via the interface correspond to operating parameters of the welding power source and when one or more from the following group is provided as operating parameter: welding current, welding voltage, current frequency, pulse rate, pulse duration, pulse-width ratio, desired position, actual position, program number, point number, welding power, operating state, system time. The mentioned operating parameters are often required for the control of a welding power source. It is therefore advantageous to also transmit the relevant operating parameters via the interface and to thus provide external machines.

It is advantageous when at least one graphic symbol is represented as a programming command and when one programming command functionally links the at least one internal connection via an interface function with the at least one external connection. Thus, the allocation between the external connections and the internal connections takes place via a program code. For example, a command can be provided which connects an internal connection to an external connection, the interchanged values being inverted in each case. The program code for the definition of the interface can be compiled in a manner known per se and subsequently executed or directly interpreted.

It is also advantageous when at least one graphic symbol is represented as a table, in which case one cell of the table is allocated to the at least one internal connection and/or to the at least one external connection of the interface and contains an interface function which functionally links the at least one internal connection with the at least one external connection. In this variant of the invention, the interface is not programmed by a program code in the conventional sense, but by the specific description of cells of a table. For example, the internal connections can be allocated to the rows and the external connections can be allocated to the columns. If a cell is described with a specific interface function, then this is applied to the connections allocated to the relevant row and column. Of course, here again this table can be converted into a program code, as described previously. However, any other method for creating a code which runs in the interface is also possible.

It is particularly advantageous when at least one graphic symbol is represented as a graphic interface symbol of its at least one internal connection and of its at least one external connection and when the interface functions are represented as further graphic interface function symbols or further graphic symbols, in which case an interface function symbol or a graphic symbol can be arranged between the at least one internal connection and the at least one external connection of the interface symbol in order to functionally link the at least one internal connection via the allocated interface function with the at least one external connection. Thus, this variant of the invention provides the programmer of an interface with a GUI (graphical user interface). By combining different interface function symbols which can be manipulated by a computer mouse, by arrow keys or by a joystick for example, it is possible to realise a desired interface function. Here again, this graphic arrangement can be converted into a program code, as described previously. However, any other method for creating a code which runs in the interface is also possible.

In this respect, it is particularly advantageous when the outer form of the interface function symbols and of the graphic symbols is configured such that the interface function symbols and graphic symbols fit together like puzzle pieces when the allocated interface functions match one another functionally. In this manner, the programmer of an interface can clearly see during or before programming, which interface functions are mutually compatible and which are not. A pointless attempt at combining two incompatible interface functions, which is rejected by the plausibility test according to the invention is therefore prevented from the start. Since the interface function symbols are differentiated according to form, this variant of the invention is particularly suitable for use on black-and-white screens or for colour-blind people.

It is also particularly advantageous when the coloured appearance of the interface function symbols and of the graphic symbols is configured such that the interface function symbols and graphic symbols match in terms of colour when the allocated interface functions match functionally. Similarly to the form of an interface function symbol, the colour thereof can also play a part in indicating to the interface programmer which interface functions can be combined and which cannot. Of course, form and colour can be varied to more clearly illustrate the differences and to expand the range of combinations. For example, two identically formed but differently coloured interface function symbols can be allocated to different interface function symbols. It is also possible for a plurality of different colours to be used in one graphic symbol, thereby making it easier to allocate the further graphic symbols which can be linked in these regions.

It is pointed out here that the variants mentioned in respect of the method according to the invention and the advantages resulting therefrom relate in equal measure to the welding power source according to the invention and to the computer program product according to the invention. This naturally also applies conversely. Furthermore, the above-mentioned measures can also be combined in any manner.

In order to gain a clearer understanding of the invention, it will be described in more detail with reference to the following figures, in which FIG. 1 schematically shows a welding machine or welding device.

First of all, it should be noted that in the differently described embodiments, identical parts have been provided with the same reference numerals or with the same component names, it being possible for the disclosures contained in the entire description to be transferred analogously to the same parts having the same reference numerals or the same component names. Furthermore, positional information chosen in the description, such as "above", "below", "at the side" etc. is based on the illustrated figure which is being directly described and, when the position is changed, is transferred analogously to the new position. In addition, individual features or combinations of features from the different embodiments which are illustrated and described can also be per se independent, inventive solutions or solutions according to the invention.

All the information concerning value ranges in the objective description should be understood such that it also includes any and all partial ranges thereof, for example, 1 to 10 should be understood such that all partial ranges, from the lower limit 1 and the upper limit 10 are also included, i.e. all partial ranges start with a lower limit of 1 or more and end with an upper limit of 10 or less, for example 1 to 1.7 or 3.2 to 8.1 or 5.5 to 10.

Figure 1:
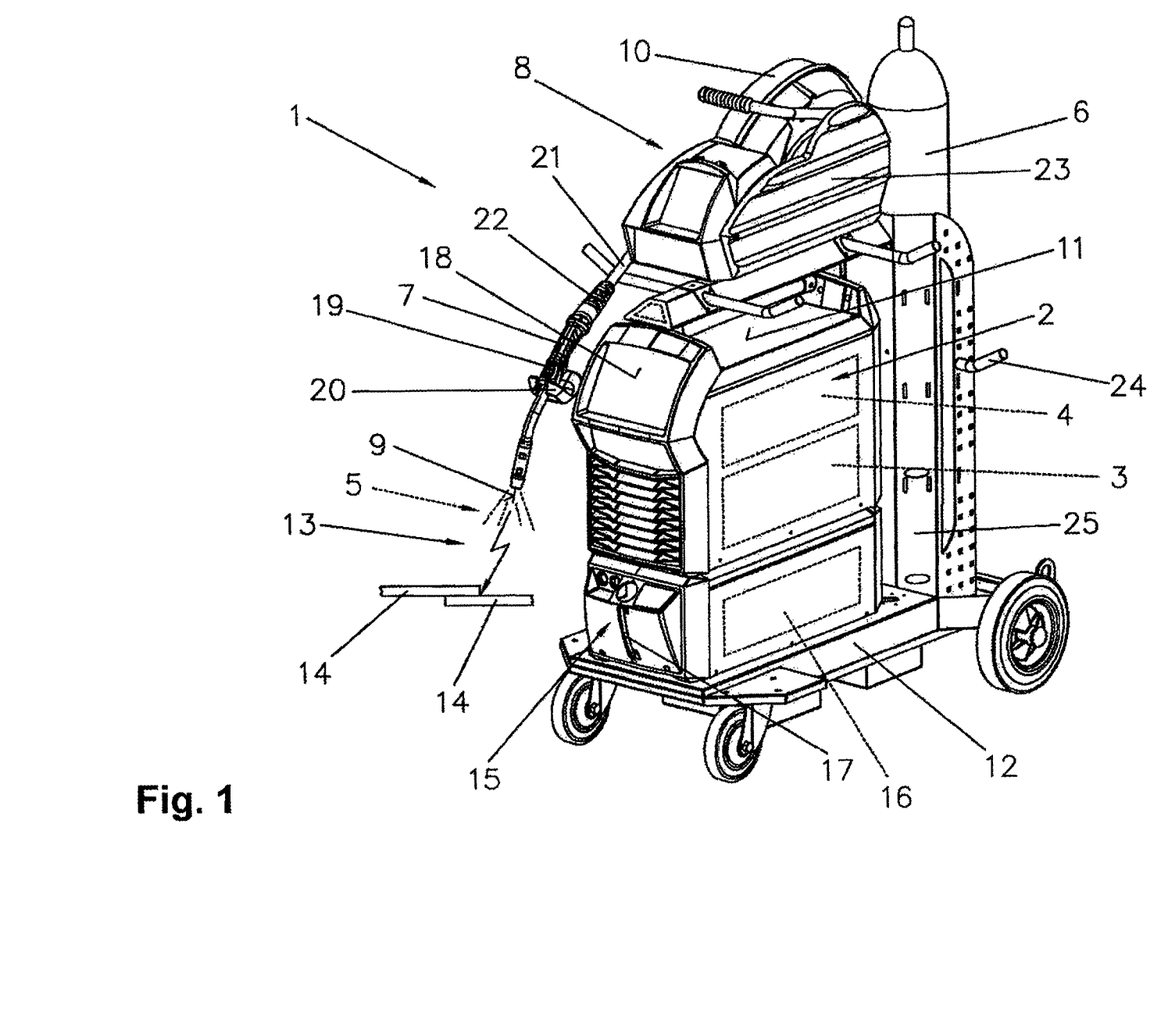

FIG. 1 shows a welding device 1 known per se or a welding plant for the most varied processes or methods, such as MIG/MAG welding or WIG/TIG welding or electrode welding methods, double wire/tandem welding methods, plasma or soldering methods etc.

The welding device 1 comprises a power source 2 with a power part 3 arranged therein, a control device 4 and further components and lines (not shown), such as a switch-over element, control valves etc. The control device 4 is connected to a control valve, for example, which is arranged in a supply line for a gas 5, in particular an inert gas, such as $CO_2$, helium or argon and the like, between a gas tank 6 and a welding torch 7 or torch.

Furthermore, the control device 4 can also control a wire feed device 8, often used in MIG/MAG welding, a filler material or a welding wire 9 being fed via a supply line from a feed drum 10 or a wire roll into the region of the welding torch 7. It is naturally possible for the wire feed device 8, as known in the prior art, to be integrated into the welding device 1, particularly into the housing 11 of the power source 2 and not to be positioned as an attachment on a carriage 12, as shown in FIG. 1. Here, this is a so-called "compact welding device" 1. In this respect, it is also possible that the wire feed device 8 is positioned directly on the welding device 2, i.e. that the housing 11 of the power source 2 is configured on the upper side to receive the wire feed device 8, so that the carriage 12 can be omitted.

It is also possible for the wire feed device 8 to feed the welding wire 9 or the filler material to the processing area outside the welding torch 7, in which case a non-consumable electrode is preferably arranged for this purpose in the welding torch 7, as is usual in WIG/TIG welding.

The current for building up an arc 13, in particular a working arc, between the electrode or the welding wire 9 and a workpiece 14, preferably formed from one or more parts, is fed to the welding torch 7, in particular to the electrode or the welding wire 9 via a welding line (not shown) from the power part 3 of the power source 2, the workpiece 14 to be welded being connected to the power source 2 via a further welding line (not shown) for the further voltage, in particular the earth cable and thus a circuit can be built up for a process via the arc 13 or the formed plasma beam. When a torch having an internal arc 13 is used, the two welding lines (not shown) are guided to the torch so that a corresponding circuit can be built up in the torch, as can be the case for a plasma torch.

To cool the welding torch 7, said torch 7 can be connected via a cooling device 15, with the interconnection of possible components such as a flow monitor, to a liquid container, in particular to a water container 16 having a fill level indication 17, as a result of which the cooling device 15, in particular a liquid pump, used for the liquid located in the water container 16, is started on activation of the welding torch 7, and thus the welding torch 7 can be cooled. As shown in the illustrated embodiment, the cooling device 15 is positioned on the carriage 12, onto which the power source 2 is subsequently placed. In this respect, the individual components of the welding plant, i.e. the power source 2, the wire feed device 8 and the cooling device 15 are configured such that they have appropriate projections and recesses so that they can be stacked or positioned securely on top of one another or on the carriage 12.

The welding device 1, in particular the power source 2 further comprises an input and/or output device 18, via which the most varied welding parameters, types of operation or welding programs of the welding device 1 can be set and retrieved and displayed. In this respect, the welding parameters, types of operation or welding programs set by the input and/or output device 18 are forwarded to the control device 4 which then controls the individual components of the welding plant or of the welding device 1 or presets appropriate regulation or control set values. Here, it is also possible that when an appropriate welding torch 7 is used, setting procedures can also be performed by the welding torch 7, in which case the welding torch 7 is equipped for this purpose with a welding torch input and/or output device 19. The welding torch 7 is preferably connected to the welding device 1, in particular to the power source 2 or to the feed device by a data bus, in particular a serial data bus. To start the welding process, the welding torch 7 generally has a starting switch, not shown, so that the arc 13 can be ignited by actuating the starting switch. To protect against the considerable heat irradiation from the arc 13, it is possible for the welding torch 7 to be equipped with a heat protection shield 20.

Furthermore, in the illustrated embodiment, the welding torch 7 is connected to the welding device 1 or to the welding plant by a hose assembly 21, the hose assembly 21 being attached to the welding torch 7 by a kink protector 22. Arranged in the hose assembly 21 are the individual lines, such as the supply line or lines for the welding wire 9, for the gas 5, for the cooling circuit, for the data transmission etc., from the welding device 1 to the torch 7, whereas the earth cable is preferably connected externally to the power source 2. The hose assembly 21 is connected to the power source 2 or to the wire feed device 8 by a coupling device (not shown), whereas the individual lines in the hose assembly 21 are attached to or in the torch 7 with a kink protector. To ensure an appropriate strain relief of the hose assembly 21, said hose assembly 21 can be connected to the housing 11 of the power source 2 or to the wire feed device 8 by a strain relief device (not shown).

As a basic principle, it should be mentioned that not all the previously mentioned components have to be used for the different welding methods or welding devices 1, such as WIG devices or MIG/MAG devices or plasma devices. For this, it is possible for example for the welding torch 7 to be configured as an air-cooled welding torch 7, so that the cooling device 15 for example can be omitted. It is also possible for further parts or components, such as an abrasion protector 23 to be arranged and used on the wire feed device 8 or for an option carrier 24 to be arranged and used on a holding device 25 for the gas tank 6 etc.

Figure 2:
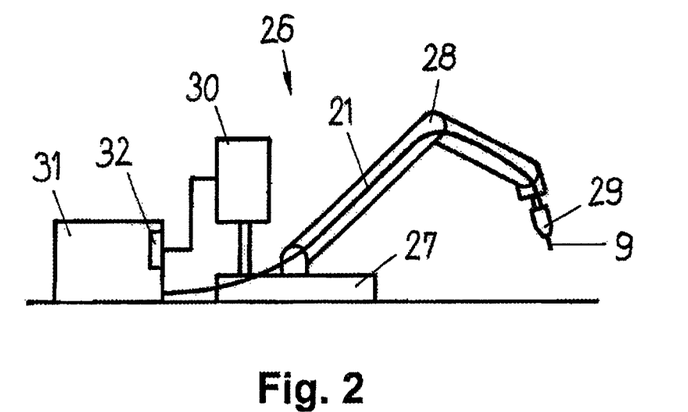
FIG. 2 schematically shows a welding robot connected to a welding power source according to the invention.

FIG. 2 is a greatly simplified illustration of a welding robot 26 with a robot base 27, a robot arm 28 and a welding head 29, from which a welding wire 9 protrudes. The welding robot 26 shown in FIG. 2 comprises a first drive system, known per se, with a control means 30, known per se, for the welding head 29. Connected to the welding robot 26 is a welding power source 31 according to the invention with an interface 32. Specifically, the welding head 29 is connected to the welding power source 31 by a hose assembly 21. Furthermore, the control means 30 of the welding robot 26 is connected to the welding power source 31 via the interface 32. In addition, the welding robot 26 and the welding power source 31 can comprise the assemblies, mentioned in respect of FIG. 1, of a composition known in principle.

Figure 3:
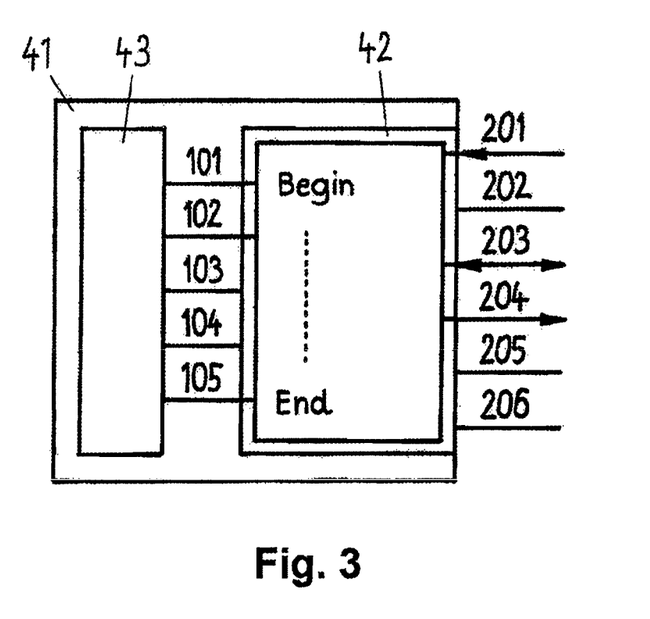
FIG. 3 shows a basic circuit diagram of a welding power source according to the invention, in which the interface functions are represented as a set of programming commands.

FIG. 3 shows a simplified electrical and logical circuit diagram of a welding power source 41 which can be used, for example, in an arrangement according to FIG. 2. The welding power source 41 comprises an interface 42 which comprises five internal connections 101 . . . 105 to a processor 43 for controlling the welding power source 41, and six external connections 201 . . . 206. These connections 101 . . . 105 and 201 . . . 206 are not necessarily configured as independent physically present lines. Instead, it is also possible that they form logical data channels which are transmitted, for example, in time-division multiplex by a serial communication connection.

In the illustrated example, the external connection 201 is configured as an input, the external connection 203 is configured as an input/output (bidirectional) and the external connection 204 is configured as an output. In this example, the other external connections 202, 205 and 206 are not occupied. The external connections 201, 203 and 204 are allocated to the internal connections 101, 102 and 105. In this example, the internal connections 103 and 104 are not occupied. The allocation between the external connections 201, 203 and 204 and the internal connections 101, 102 and 105 takes place via a program code. For example, a command can be provided which connects the internal connection 101 to the external connection 201. Furthermore, it is possible for a command to be provided which connects the internal connection 102 to the external connection 203, the interchanged values being inverted in each case. Finally, it is possible for a further command to be provided which connects the internal connection 105 to the external connection 204, the interchanged values being multiplied by two. Of course, the specified links are to be seen purely as examples. Naturally, any other link is also possible.

The interface 31 is thus represented as a set of programming commands, one programming command functionally linking an internal connection 101, 102 and 105 with an external connection 201, 203 and 204 via an interface function. In FIG. 3, this is symbolised by a command sequence which is not defined in more detail and is delimited by the instructions "begin" and "end". This program code can be compiled or interpreted in a manner known per se.

Figure 4:
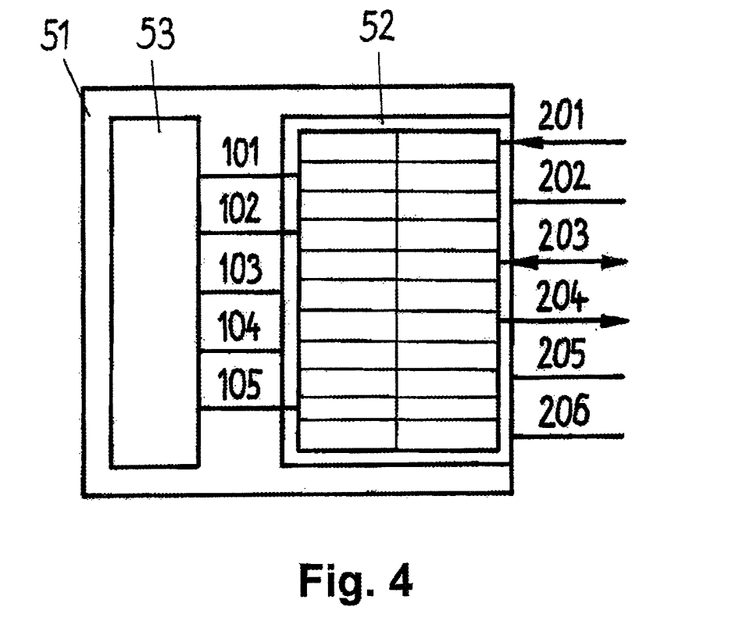
FIG. 4 shows a basic circuit diagram of a welding power source according to the invention in which the interface functions are represented as a table.

FIG. 4 shows an alternative embodiment of a welding power source 51 according to the invention which is very similar to the welding power source 41 shown in FIG. 3. However, in contrast, the internal connections 101, 102 and 105 and the external connections 201, 203 and 204 are linked together not via a program code but via a table. The interface 52 is thus represented as a table in which one cell of the table is allocated to an internal connection 101, 102 and 105 and/or to an external connection 201, 203 and 204 of the interface and contains an interface function which functionally links an internal connection 101, 102 and 105 with an external connection 201, 203 and 204. For example, the internal connections 101 . . . 105 can be allocated to the rows of the table and the external connections 201 . . . 206 can be allocated to the columns. If a cell is described at the intersection point of a specific row and a specific column with an interface function, then the relevant internal connection 101 . . . 105 and the relevant external connection 201 . . . 206 are linked functionally with one another via the corresponding interface function.

Remaining with the previous example, a "1" can be entered in the cell allocated to the internal connection 101 and to the external connection 201 in order to connect them. Similarly, a "−1" can be entered in the cell allocated to the internal connection 102 and to the external connection 203 in order to connect them and to invert the transmitted values. Furthermore, "×2" can be entered in the cell allocated to the internal connection 105 and to the external connection 204 in order to connect them and to multiply the interchanged values by two.

Figure 5:
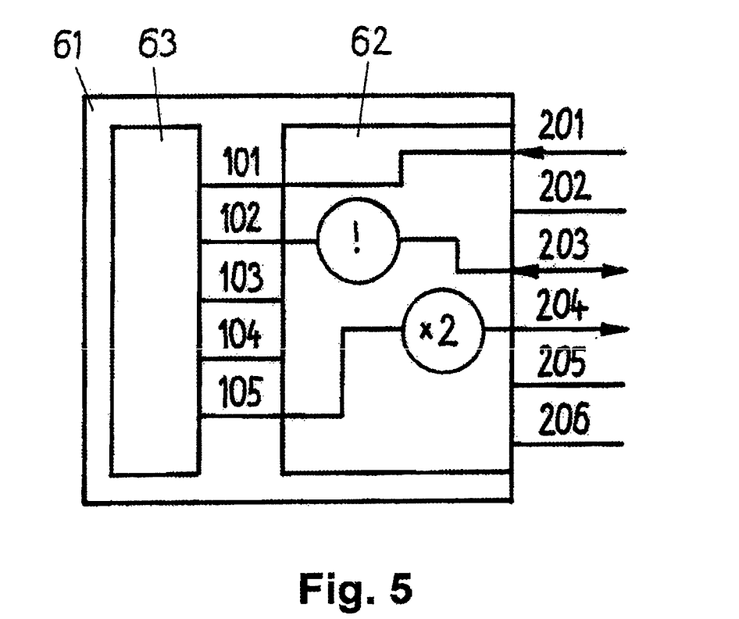
FIG. 5 shows a basic circuit diagram of a welding power source according to the invention in which the interface functions are represented as graphic symbols.

FIG. 5 shows an alternative embodiment of a welding power source 61 according to the invention which is again very similar to the welding power source 41 shown in FIG. 3. However, in contrast, the internal connections 101, 102 and 105 and the external connections 201, 203 and 204 are linked together not via a program code but via graphic symbols.

The interface 62 is thus represented as a graphic interface symbol of its internal connections 101 ... 105 and of its external connections 201 ... 206 and the interface functions are represented as graphic interface function symbols. It is possible to arrange an interface function symbol between the internal connections 101 ... 105 and the external connections 201 ... 206 of the interface symbol in order to functionally link an internal connection 101 ... 105 with an external connection 201 ... 206 via the allocated interface function.

Specifically, in the present example, the internal connection 101 is connected to the external connection 201 via the graphic symbol "line", so that data can be transmitted between the internal connection 101 and the external connection 201. Furthermore, the internal connection 102 is connected to the external connection 203 via the graphic symbol "!", so that data can be transmitted between the internal connection 102 and the external connection 203, which data is, however, inverted during transmission. Finally, the internal connection 105 is connected to the external connection 204 via the graphic symbol "×2", so that data can be transmitted between the internal connection 105 and the external connection 204, which data is multiplied by two during transmission.

According to the invention, a request to functionally link an internal connection 101 ... 105 via an interface function, selected from a set of interface functions, with an external connection 201 ... 206, is subjected to a plausibility test. Only if the result of the plausibility test is positive will the request be carried out. This plausibility test can be carried out per se at any time during the course of the process, for example during compilation, implementation or interpretation of the code, during implementation of the interface functions entered in the table or while implementing the graphically represented interface functions. However, it is particularly advantageous if this plausibility test is carried out during the editing of the code, the table or the graphically represented interface. For example, command sequences, interface functions or symbols which are implausible can be marked in colour.

The following, for example, can be provided as interface functions:
    allocation of an internal connection 101 ... 105 to an external connection 201 ... 206
    scaling of a value transmitted between the at least one internal connection 101 ... 105 and the at least one external connection 201 ... 206
    conversion of a unit of a value transmitted thus
    transformation of a data format of a value transmitted thus
    inversion of a value transmitted thus
    time-delay of a value transmitted thus.

The values transmitted via the interface 32, 42, 52, 62 can correspond to operating parameters of the welding power source 31, 41, 51, 61, for example:
    welding current
    welding voltage
    current frequency
    pulse rate
    pulse duration
    pulse-width ratio
    operating state
    system time
    desired position
    actual position
    program number
    point number
    welding power In addition to the direct programming of the (physical) interface 32, 42, 52, 62, it is also possible to create an interface definition using a model of the interface 32, 42, 52, 62 and a model, connected thereto, of a machine connected thereto (thus in the specific example, using a model of the welding robot 26 or using a model of the control means 30 thereof), which interface definition is subjected to a plausibility test. Only if the result of the plausibility test is positive will the interface definition be transferred into the real interface 32, 42, 52, 62. Of course, in this variant as well, it is possible for plausibility tests to be carried out for the individual requests of interface definitions in the model during the creation or editing of the interface definition, as previously mentioned.

It is advantageous when the outer form of the interface function symbols is configured such that the interface function symbols fit together like puzzle pieces when the allocated interface functions match one another functionally. It is likewise advantageous when the outer form of the interface function symbols and of the interface symbol is configured such that the interface function symbols and the interface symbol fit together like puzzle pieces when the allocated interface functions functionally match the at least one input and/or the at least one output. FIGS. 6 to 19 show some examples of this.

Figure 6:
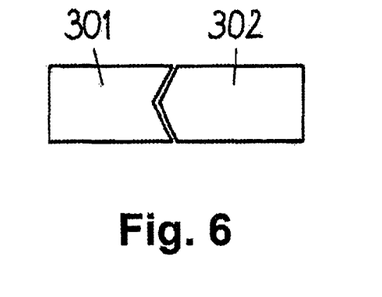
FIG. 6 shows a first example of how graphic interface function symbols can be combined in the manner of a puzzle.

FIG. 6 shows an example of a combination of an interface function symbol 301 with an interface function symbol 302. On the left-hand side, the interface function symbol 302 has an arrow-shaped end which fits into a corresponding recess in the interface function symbol 301. In this manner, when the interface function symbols are joined together, i.e. when an interface definition is being created or edited, it is clear which interface function symbols fit together and which do not. A signal path, here from right to left, can also be visualised through the arrow-shaped recess to further simplify the creation of an interface definition. However, in principle, the signal in FIG. 6 can also flow from left to right.

Figure 7:
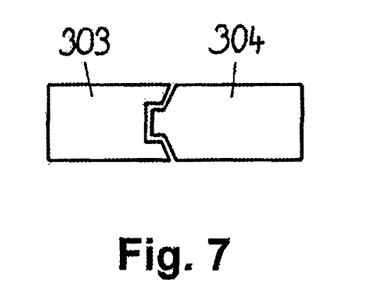
FIG. 7 shows a second example of how graphic interface function symbols can be combined in the manner of a puzzle with a different outer form of the interface function symbols.

FIG. 7 shows a further example of a combination of an interface function symbol 303 with an interface function symbol 304. On the left-hand side, the interface function symbol 304 has an arrow-shaped end with a peg-shaped extension, the interface function symbol 303 has a correspondingly mirror-inverted end. The advantages mentioned in respect of FIG. 6 apply here analogously.

Figure 8:
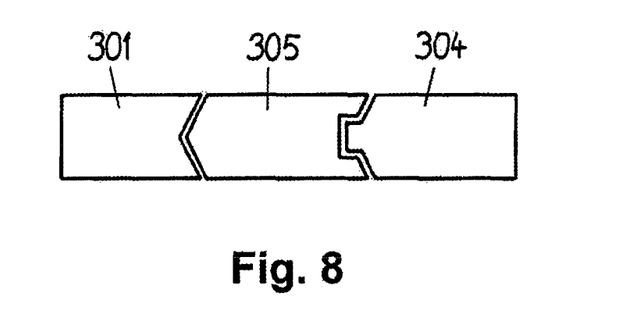
FIG. 8 shows a third example of how graphic interface function symbols can be combined in the manner of a puzzle with three combined interface function symbols.

FIG. 8 shows a combination of three interface function symbols 301, 305 and 304. The interface function symbol 305 allows the combination of the interface function symbols 301 and 304 already shown in FIGS. 6 and 7.

Figure 9:
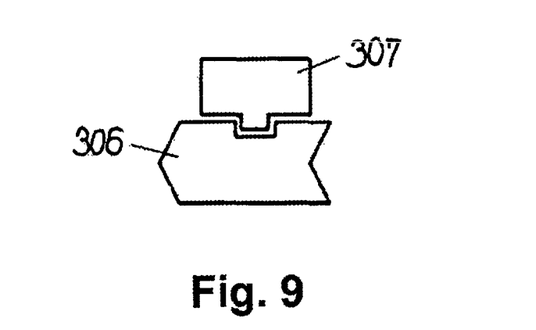
FIG. 9 shows a fourth example of how graphic interface function symbols can be combined in the manner of a puzzle with laterally connected interface function symbols.

Furthermore, FIG. 9 indicates that the combination of interface function symbols can occur not only horizontally but also in a vertical direction. Purely by way of example, an interface function symbol 306 is shown with a rectangular indentation arranged in the upper side thereof, into which a peg-shaped extension of an interface function symbol 307 projects.

Figure 10:
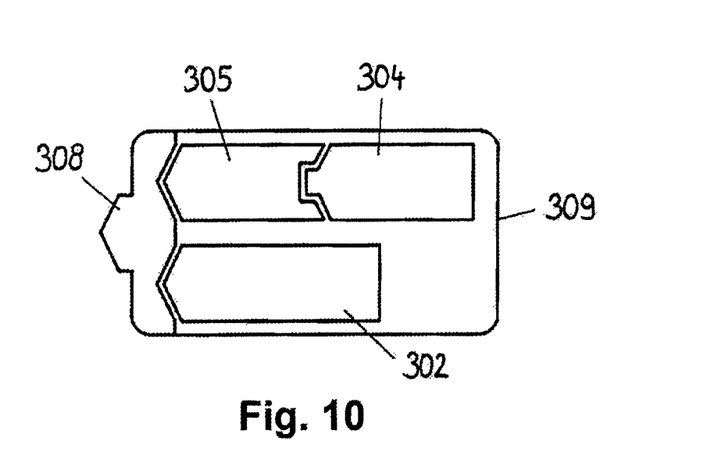
FIG. 10 shows a combination of a plurality of branches of interface function symbols in one group.

FIG. 10 shows furthermore that different strands of interface function symbols can also be combined together. Purely by way of example, the interface function symbol 305 which is connected to the interface function symbol 304, and the interface function symbol 302 are combined via the interface function symbol 308. In addition, a group consisting of the interface function symbols 302, 304, 305 and 308 is formed with the symbol 309.

It is pointed out here that in the previous embodiments, it has merely been shown until now how the interface function symbols 301 ... 309 can be combined together, but not how they cooperate with an interface symbol. For example, the illustration of an internal connection 101 ... 105 or of an external connection 201 ... 206 can have an arrow-shaped indentation (like interface function symbol 301) or an arrow-shaped bulge (like interface function symbol 302), to indicate the possibility of the combination with the interface function symbol 302 and with the interface function symbol 301.

Furthermore, in the previous embodiments, it has merely been shown until now how the interface function symbols can appear in order to be combined in the manner of a puzzle. However, the interface function symbols have not yet been allocated to interface functions. Thus, the following figures show which interface function symbols can represent which interface functions.

Figure 11:
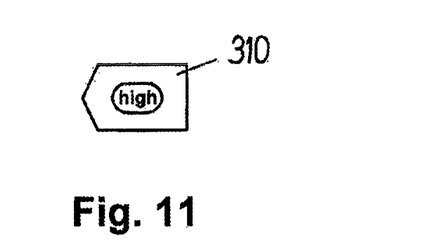
FIG. 11 shows an example of an interface function symbol with the function "state allocation"

In FIG. 11, for example the interface function symbol 302, basically already known from FIG. 6, is expanded into an interface function symbol 310 which, purely by way of example is used to allocate a state. Specifically, the state "high" is allocated to the internal connection 101 ... 105 or to the external connection 201 ... 206 of the interface 32, 42, 52, 62, to which the interface function symbol 310 is added.

Figure 12:
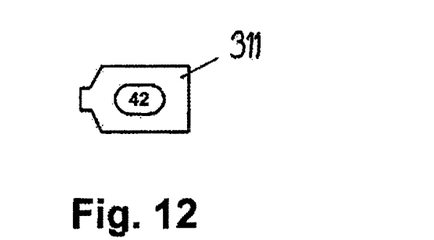
FIG. 12 shows an example of an interface function symbol with the function "value allocation"

Similarly, in FIG. 12, the interface function symbol 304, basically already known from FIG. 7, is expanded into an interface function symbol 311 which, purely by way of example, is used to allocate a value. Specifically, the value "42" is allocated to the internal connection 101 ... 105 or to the external connection 201 ... 206 of the interface 32, 42, 52, 62, to which the interface function symbol 311 is added.

Figure 13:
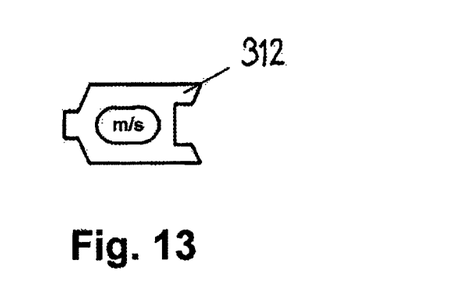
FIG. 13 shows an example of an interface function symbol with the function "unit conversion"

FIG. 13 shows an interface function symbol 312 which purely by way of example, is used for the conversion of units. Specifically, values transmitted via the interface 32, 42, 52, 62 are converted into "m/s" (for example from inch/s) using the interface function symbol 312.

Figure 14:
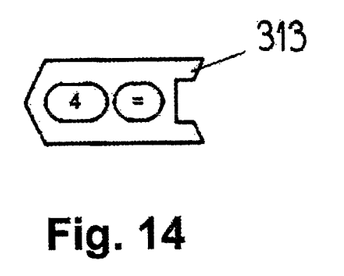
FIG. 14 shows an example of an interface function symbol with the function "value query"

The interface function symbol 313 shown in FIG. 14 is used purely by way of example to request values. As an example, a value "4" is provided which is fed in on the right-hand side of the interface function symbol 313.

Figure 15:
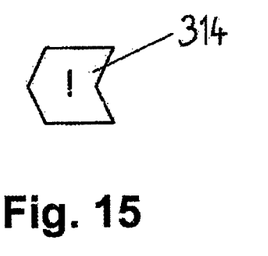
FIG. 15 shows an example of an interface function symbol with the function "invert"

FIG. 15 shows an interface function symbol 314 for inverting values. If, for example, the value "0" is fed in on the right-hand side of the interface function symbol 314, then the interface function allocated to the interface function symbol 314 outputs the value "1".

Figure 16:
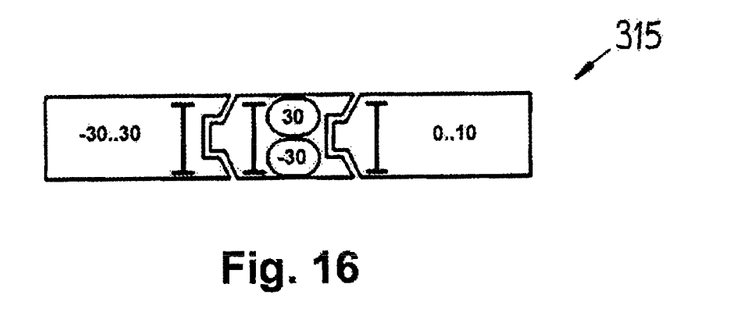
FIG. 16 shows an example of an interface function symbol group with the function "scale"

FIG. 16 shows by way of example an arrangement 315 of interface function symbols used for scaling values. For example, a value range of 0 ... 10, fed in on the right-hand side of the arrangement 315 is presented on the left-hand side on −30 ... 30.

Figure 17:
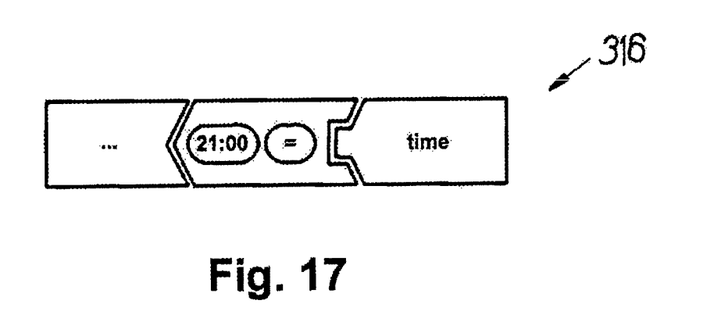
FIG. 17 shows an example of an interface function symbol group with the function "time query"

Furthermore, FIG. 17 shows an example of an arrangement 316 for requesting a system time "time". Specifically, the system time "21:00" is read out. This value can then be further processed, for example, in any desired manner. For example, the welding power source 31 and the control means 30 of the welding robot 26 can thus be synchronised in time.

Figure 18:
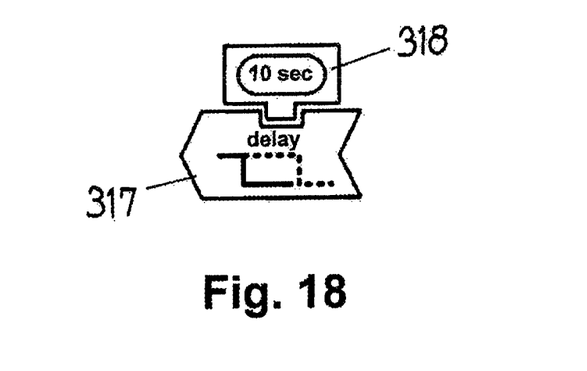
FIG. 18 shows an example of an interface function symbol group with the function "time delay"

In FIG. 18, the interface function symbols 306 and 307, basically already known from FIG. 9, are expanded into interface function symbols 317 and 318. The illustrated arrangement is used purely by way of example for time delay during the transmission of a value. Specifically, a value, fed in on the right-hand side of the interface function symbol 317 is delayed by 10 seconds, before it is output on the left-hand side.

Figure 19:
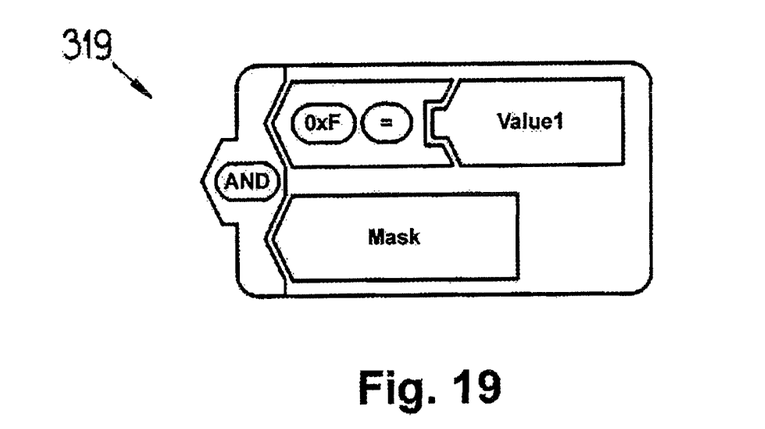
FIG. 19 shows an example of an interface function symbol group with the function "AND link"

FIG. 19 shows by way of example an arrangement 319 of interface function symbols, which arrangement is based on the arrangement of FIG. 10. Specifically, a value "value 1" is read out which has the hexadecimal value "0xF". This is linked by AND with a mask "mask". The result is output on the left-hand side of the arrangement 319.

In FIGS. 6 to 19, interface function symbols have been shown which fit together like puzzle pieces when the allocated interface functions match one another functionally. However, it is also possible for the coloured appearance of the interface function symbols to be configured such that the interface function symbols match in terms of colour when the allocated interface functions are a functional match. It is equally conceivable for the coloured appearance of the interface function symbols and of the interface symbol to be configured such that the interface function symbols and the interface symbol match in terms of colour when the allocated interface functions functionally match the at least one input and/or the at least one output.

Figure 20:
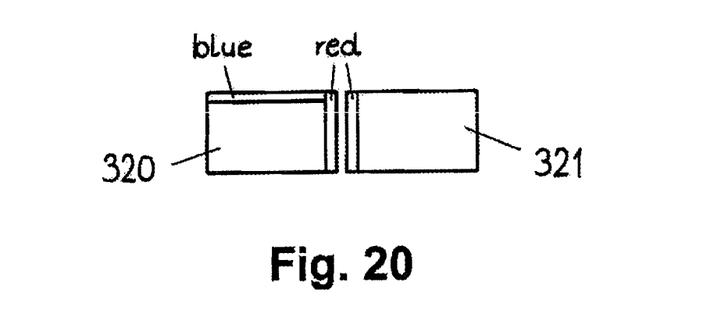
FIG. 20 shows an example of how coloured interface function symbols can be combined.

FIG. 20 shows an example of this, more specifically in the form of an interface function symbol 320 which is combined with an interface function symbol 321. The right-hand edge of the interface function symbol 320 is coloured red and the upper edge is blue. In contrast, the left-hand edge of the interface function symbol 321 is red. It is assumed that the interface function symbols 320 and 321 are otherwise neutral in colour. Here as well, a user of the method according to the invention can immediately see that the interface function symbol 320 can be combined with the interface function symbol 321, even if the form per se of the interface function symbols 320 and 321 gives no indication of this.

The arrangement shown in FIG. 20 is to be seen purely as an example. In addition to the illustrated colour configuration, interface function symbols can be coloured in any complex fashion to indicate the possibility of a combination with another interface function symbol.

Of course, interface function symbols can be configured like puzzle pieces as well as being differentiated in terms of colour, so that it is particularly easy to see which interface function symbol can be combined with which other interface function symbol or with which internal connection 101 ... 105 or external connection 201 ... 206.

In general, the interface 32, 42, 52, 62, regardless of whether it is represented as a program code, a table or by graphic symbols, can be programmed directly at the welding power source 31, 41, 51, 61 or at a detached personal computer. In the case of a detached personal computer, the interface definition is created using a model of the interface 32, 42, 52, 62 and a model, connected thereto, of the machine connected to the welding power source 31, 41, 51, 61. The programming is thus carried out "offline", thereby making it possible to avoid expensive downtimes of the welding power source 31, 41, 51, 61 or of the machine connected thereto (for example of the welding robot 26). Likewise it is possible to create the interface definition before the installation of the welding power source 31, 41, 51, 61 or of the welding robot 26, so that the start up can take place quickly. Finally, it is also possible to maintain the interface 32, 42, 52, 62 from a distance. Expensive journeys undertaken by technical staff can be avoided as a result.

In conclusion, it is pointed out that the welding robot 26 is only one embodiment of a machine connected to a welding power source 31, 41, 51, 61. It is also possible for the welding robot 26 to be of a different type. For example, it can be configured as a gantry robot.

The embodiments show possible configuration variations of a welding power source 31, 41, 51, 61 according to the invention, it being pointed out here that the invention is not restricted to the specifically illustrated variants thereof, instead diverse combinations of the individual variants among one another are also possible and this variation possibility lies within the capabilities of a person skilled in this technical field due to the directive for technical actions by the objective invention. Thus, all conceivable variants which are possible through combinations of individual details of the illustrated and described variants are also included within the scope of protection.

In particular, it has been established that the interface 32, 42, 52, 62 can also be connected to further units which are present in addition to the actual power source and are usually required for welding. For example, the interface 32, 42, 52, 62 can be connected to magnetic valves, pressure controllers and the like for controlling a stream of welding gas, or to pumps and ventilators for cooling the welding torch etc. In this sense, a "welding power source" 31, 41, 51, 61 is not understood as meaning just a power source as such, but also a power source with additional units. In particular, the welding power source 31, 41, 51, 61 according to the invention can include the features which have been mentioned in respect of FIG. 1 and which can also be connected to the interface 32, 42, 52, 62 according to the invention in a particular embodiment.

Figure 21:
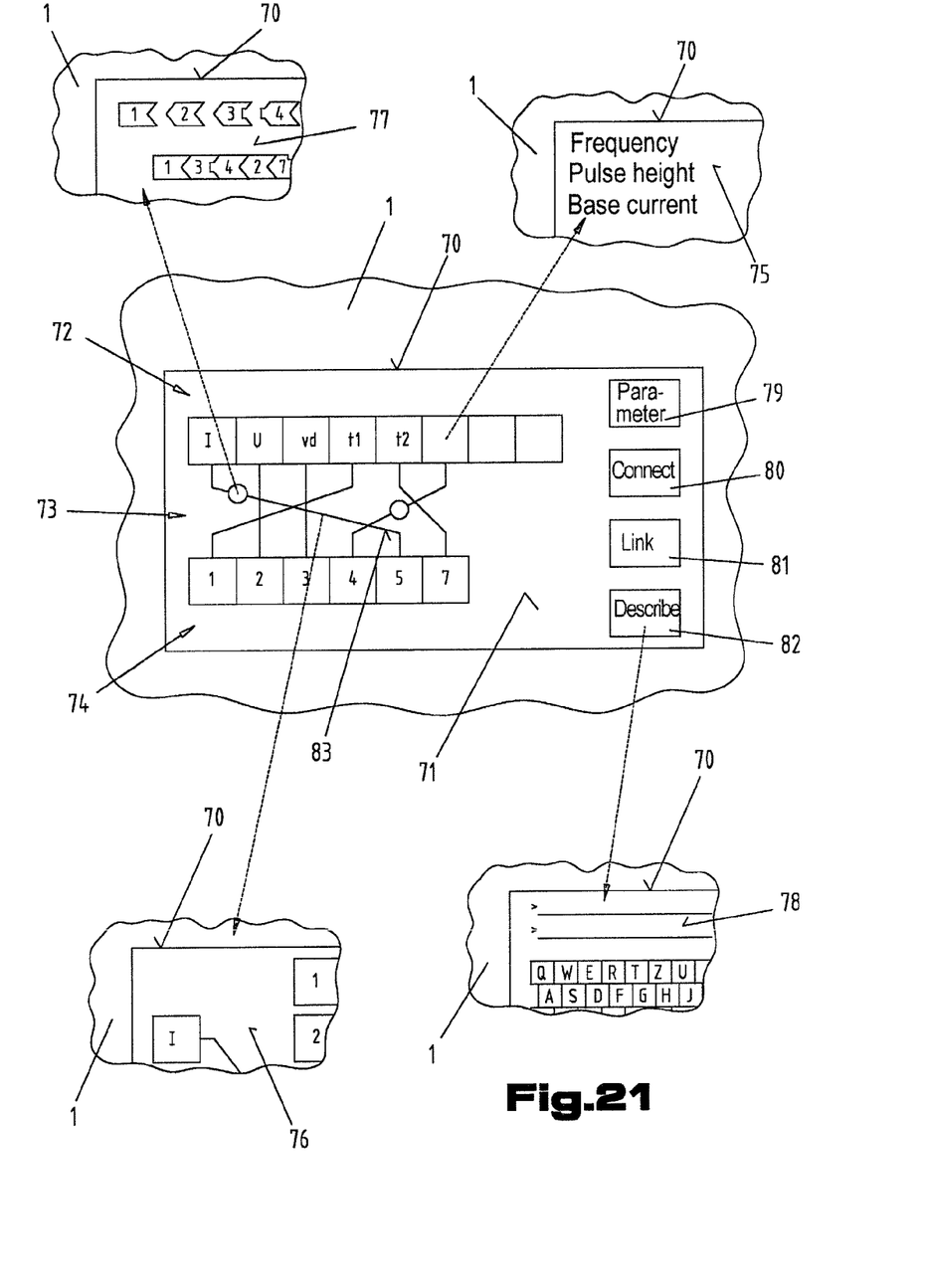
FIG. 21 shows an embodiment of a configuration of the interface from the welding device 1.

FIG. 21 shows a schematic, simplified illustration for configuring the interface via an operating panel 70 of the input and/or output device 19 directly from the welding device 1. The difference compared to the previously described embodiments is that in this use, no internal connections 101 . . . 105 are present, but the allocation takes place in a direct manner. For this purpose, an enlargement of the operating panel 70, for example from the welding plant shown in FIG. 1 is shown. It is pointed out that the sequence of operations and the formation as well as the mode of operation is shown only as an example of the disclosure of the use at the welding device 1, although implementation is also possible in a different manner.

A touch screen is preferably used as the operating panel 70 so that the operator can select diverse display elements by touch alone. It is also possible for the operator to freely configure the surface, i.e. the user can reposition the individual fields, symbols, graphics, texts etc. by clicking and relocating, in which case the user switches over the control device 4 or the welding device 1 in a mode provided for this purpose. It is also possible for this mode, in particular a positioning mode to be called up by repeatedly quickly pressing on a field, a symbol, a graphic etc. or the mode can be initiated by holding down the field etc. for a relatively long time.

It is significant that, by calling up an appropriate menu, in particular an interface mode, the user is able to configure the interface (not shown) which is arranged in the welding device 1 directly at the welding device 1. For this purpose, a freely configurable interface is arranged in the welding device 1, the interface being directly controlled, configured and activated in terms of software via the operating panel 70 of the welding power source.

In this regard, FIG. 21 shows for example a main menu 71 of the operating panel 70 in interface mode with a parameter region 72 for defining the required parameters, a linking region 73 and an output region 74 of the external connections, as well as symbolically opening submenus 75 to 78 (which are only shown as extracts) from which the user can then select a plurality of options which are transferred into the main menu 71. Furthermore, buttons are provided for calling up different functions, such as parameter 79, connect 80, link 81 and describe 82, for which in turn the or other submenus 75 to 78 are called up. However, these functions can also be called up when the user presses the displays so that a correspondingly stored function is called up.

The user then has the opportunity of allocating any parameter of the welding device 1 from the parameter region 72 to any external connection 101 . . . 105 of the connection region 74 and of changing this parameter by simply pressing an appropriate symbol in the parameter region 72, whereupon a submenu 75 with a list of parameters is opened. He selects the parameter from this list simply by clicking, whereupon this parameter or an abbreviation thereof is displayed at the symbol in the main menu 71. The same function could also be performed by the parameter button 79.

After the user has selected one or all the parameters, he can allocate each parameter to an external connection. For example, upon activating the "connect" button 80, the linking region 73, in particular the submenu 76 can be activated, so that the user can now freely decide which selected parameter in the parameter region 72 is allocated to which external output in the output region 74 and this is then presented graphically in the form of connection lines 83, i.e. for example the parameter "I" (welding current) in parameter region 72 is allocated to the external output "5" in the output region 74 by the user by clicking on both symbols, and at the end of the procedure, the connection line 83 is presented so that the user receives a visual presentation.

Furthermore, the user has the possibility of creating a link by stringing together software graphic symbols, for which he presses the "link" button 81 or presses the connection line 83. This in turn calls up a submenu 77 where the user is presented with the different graphic symbols. In this respect, it is possible that simply by pressing and then relocating, the symbols are strung together and thus a corresponding link can be created, as already mentioned in the previously described figures. When a link is created, it is represented, for example, by a circular symbol in the connection line 83, so that the user can see at a glance that a link has been stored for this allocation. As already mentioned in the embodiments of the previously described figures, the links can contain functions, allocations and definitions etc.

If the user operates the "description" button 82, for example, a submenu 78 is opened in which the user can add any text for any function or even general text which is stored accordingly in the welding device 1. For this purpose, a type of keyboard is superimposed so that the input options of the welding device 1 are increased and thus text inputs are also possible.

Naturally, it is possible that the interface is already predefined by the manufacturer and the user only has to make changes, i.e. when calling up this mode, the already configured interface with the parameters, connections and links is presented and the user can then make further adjustments, changes and additions.

It is also possible that the user deletes an already existing interface configuration or that a plurality of interface configurations can be saved which the user can recall at any time. The configurations are preferably saved on a storage medium arranged in the welding device 1. For this, it is also possible for a "save" button to be provided. In addition, further buttons can also be provided which have not been shown or mentioned in the illustrated and described embodiments.

Furthermore, a debugging means is integrated for tracing and testing the data exchange and the data allocation, as a result of which a detailed error analysis is possible using said debugging means. It is thereby possible to record individual signals and/or variables and/or to simulate sequences, the recorded signals being presented in a so-called graph (i.e. a presentation as on an oscilloscope) or as text.

Furthermore, it is possible to subsequently analyse past events. For this purpose, a list is made of current events and is stored so that it can be accessed at a later stage. In this respect, the recording is carried out in a ring buffer so that it is possible to have a specific period of time available for debugging at any time of the implementation, i.e. the individual items of data are stored successively in time in the ring buffer and it is then possible for the user to call up the individual times with the associated data step-by-step and to look at them. The user can do this directly at the welding device or, when the welding device is connected to a computer, looked at via the computer. A procedure of this type is known as "post mortem debugging". In this respect, it is also possible for the size of the ring buffer to be freely configurable.

Triggers can be defined for the starting and stopping of a recording. The length of recording time before or after the trigger event can be distributed in any manner over the available ring buffer. The trigger itself is initiated by adjustable signal states.

Furthermore, a so-called live debugging is possible in which the actual states of the individual variables, functions or inputs/outputs are presented visually, without changing the sequence of the program, i.e. the user is able to directly follow the manner in which the interface, which he has configured, is working. In this respect, it is possible to set a break point anywhere in the program sequence and thus to look at the current state at a specific point in the program sequence. Furthermore, the sequence can be continued step-by-step following directions (step debugging). In order to be able to simulate specific situations, it is possible to allocate specific states to individual signals and/or variables, so that the user can also definitively test special cases which only occur very rarely.

In addition, it is possible that due to the debugger, a simulation of the interface configuration can be performed, where "simulation" is understood as meaning that the program sequence is simulated virtually offline. For this purpose, all the points mentioned for debugging are also available in offline mode.

In principle, it should be mentioned that a method for defining an interface 32, 42, 52, 62 of the welding power source 31, 41, 51, 61, in particular of the welding device 1, for communication with an external machine 26 (not shown) which is connected to the interface is described, the interface for communication with the machine 26 connected to the welding power source 31, 41, 51, 61 preferably being configured for a parallel data communication and comprising at least one external connection, a use of a freely configurable interface in the welding device 1 being required, the interface being controlled, configured and activated in terms of software directly via the operating panel 70 of the welding power source 31, 41, 51, 61 or an external device which can be connected to the welding power source 31, 41, 51, 61, in particular via an operating panel, and that a parameter of the welding device 1 is allocated to an internal and/or external connection and optionally a link is created by stringing together graphic symbols of a piece of software.

As a matter of form, it is finally pointed out that to gain a clearer understanding of the construction of the welding robot 26, said robot or the components thereof have to some extent been shown not to scale and/or on a large scale and/or on a small scale.

The object on which the independent inventive solutions are based can be learnt from the description.

LIST OF REFERENCE NUMERALS

1 Welding device
2 Power source
3 Power part
4 Control device
5 Gas
6 Gas tank
7 Welding torch
8 Wire feed device
9 Welding wire
10 Feed drum
11 Housing
12 Carriage
13 Arc
14 Workpiece
15 Cooling device
16 Water tank
17 Fill level indication
18 Input and/or output device
19 Welding torch input and/or output device
20 Heat protection shield
21 Hose assembly
22 Kink protector
23 Abrasion protector
24 Option carrier
25 Holding device
26 Welding robot
27 Robot base
28 Robot arm
29 Welding head
30 Robot control means
31, 41, 51, 61 Welding power source
32, 42, 52, 62 Interface
33, 43, 53, 63 Processor
70 Operating panel
71 Main menu
72 Parameter region
73 Linking region
74 Output region
75 . . . 78 Submenu
79 "Parameter" function
80 "Connect" function
81 "Link" function
82 "Describe" function
83 Connection line
101 . . . 105 Internal connections
201 . . . 206 External connections
301 . . . 307 General interface symbol
308 Interface function symbol "combine"
309 Group symbol
310 Interface function symbol "state allocation"
311 Interface function symbol "value allocation"
312 Interface function symbol "value conversion"
313 Interface function symbol "value query"
314 Interface function symbol "invert"
315 Interface function symbol group "scale"

316 Interface function symbol group "time request"
317, 318 Interface function symbol group "time delay"
319 Interface function symbol group "AND link"
320, 321 Coloured interface function symbols

The invention claimed is:

1. A method for defining an interface of a welding power source for communication with a controller of a welding device connected to the interface, the interface configured for communication with the controller connected to the welding power source and being configured for parallel communication of data and comprising at least one external connection and at least one internal connection, the method comprising:
controlling, configuring and activating a configurable interface in the welding power source directly via an operating panel of the welding power source or via an external device which can be connected to the welding power source via the operating panel;
allocating a parameter of the welding device to at least one of the internal connection and at least one of the external connection;
testing an interface definition which has been created using a model of the interface and a model, connected thereto, of the controller of the welding device, for plausibility, wherein errors in creating the configurable interface are avoided, and
transferring the interface definition into the interface if the result of the plausibility test is positive,
wherein interface functions are represented as graphic symbols and comprise at least one function from the following:
allocation of an internal connection to an external connection;
scaling of a value transmitted between the at least one internal connection and the at least one external connection;
conversion of a unit of a transmitted value;
transformation of a data format of a transmitted value;
inversion of a transmitted value; and
time delay of a transmitted value and the function is integrated into the graphic symbol as a code.

2. The method according to claim 1, wherein values transmitted via the interface correspond to operating parameters of the welding power source and one or more of the following group is provided as the operating parameter: welding current, welding voltage, current frequency, pulse rate, pulse duration, pulse-width ratio, desired position, actual position, program number, point number, welding power, operating state, and system time.

3. The method according to claim 1, wherein at least one graphic symbol is represented as a programming command and the one programming command functionally links the at least one internal connection via an interface function with the at least one external connection.

4. The method according to claim 1, wherein at least one graphic symbol is represented as a table and one cell of the table is allocated to the at least one internal connection and/or the at least one external connection of the interface and contains an interface function which functionally links the at least one internal connection with the at least one external connection.

5. The method according to claim 1, wherein at least one graphic symbol is represented as a graphic interface symbol of its at least one internal connection and of its at least one external connection and the interface functions are represented as further graphic interface function symbols or further graphic symbols, wherein the interface function symbol or the graphic symbol is arrangeable between the at least one internal connection and the at least one external connection of the interface symbol in order to functionally link the at least one internal connection via an allocated interface function with the at least one external connection.

6. The method according to claim 5, wherein the interface function symbols and the graphic symbols have colors such that the interface function symbols and graphic symbols match in terms of color when allocated interface functions match functionally.

7. The method according to claim 1, wherein an outer form of the interface function symbols and of the graphic symbols is configured such that the interface function symbols and graphic symbols have mirror inverted ends to fit together when allocated interface functions match one another functionally.

8. A welding power source comprising an interface configured to communicate with a controller of a welding device connected to a welding power source, the interface comprising at least one external connection and at least one internal connection, wherein:
a configurable interface is arranged in the welding power source, wherein the configurable interface can be controlled, configured and activated directly via one of the welding power source and an external device connectable to the welding power source via an operating panel, wherein the welding power source is configured to:
allocate a parameter of the welding device to at least one of the internal connection and the external connection;
test an interface definition which has been created using a model of the interface and a model, connected thereto, of the controller of the welding device, for plausibility, wherein errors in creating the configurable interface are avoided; and
transfer the interface definition into the interface if the result of the plausibility test is positive,
wherein interface functions are represented as graphic symbols and comprise at least one function from the following:
allocation of an internal connection to an external connection;
scaling of a value transmitted between the at least one internal connection and the at least one external connection;
conversion of a unit of a transmitted value;
transformation of a data format of a transmitted value;
inversion of a transmitted value; and
time delay of a transmitted value and the function is integrated into the graphic symbol as a code.

9. At least one non-transitory computer-readable medium storing an executable set of instructions configured to be stored in a memory of one of a personal computer and a welding power source, the at least one non-transitory computer-readable medium configured such that, when the set of instructions is executed by a processor, causes the processor to execute operations comprising:
controlling, configuring and activating a configurable interface in a welding power source directly via an operating panel of the welding power source or via an external device which can be connected to the welding power source via the operating panel;
allocating a parameter of the welding device to at least one of an internal connection and an external connection;
testing an interface definition which has been created using a model of an interface and a model, connected thereto, of a controller of the welding device, for plausibility, wherein errors in creating the configurable interface are avoided, and transferring the interface definition into the interface if the result of the plausibility test is positive, wherein interface functions are represented as graphic symbols and comprise at least one function from the following:

allocation of an internal connection to an external connection;

scaling of a value transmitted between the at least one internal connection and the at least one external connection;

conversion of a unit of a transmitted value;

transformation of a data format of a transmitted value;

inversion of a transmitted value; and time delay of a transmitted value and the function is integrated into the graphic symbol as a code.

* * * * *